United States Patent Office 3,790,547
Patented Feb. 5, 1974

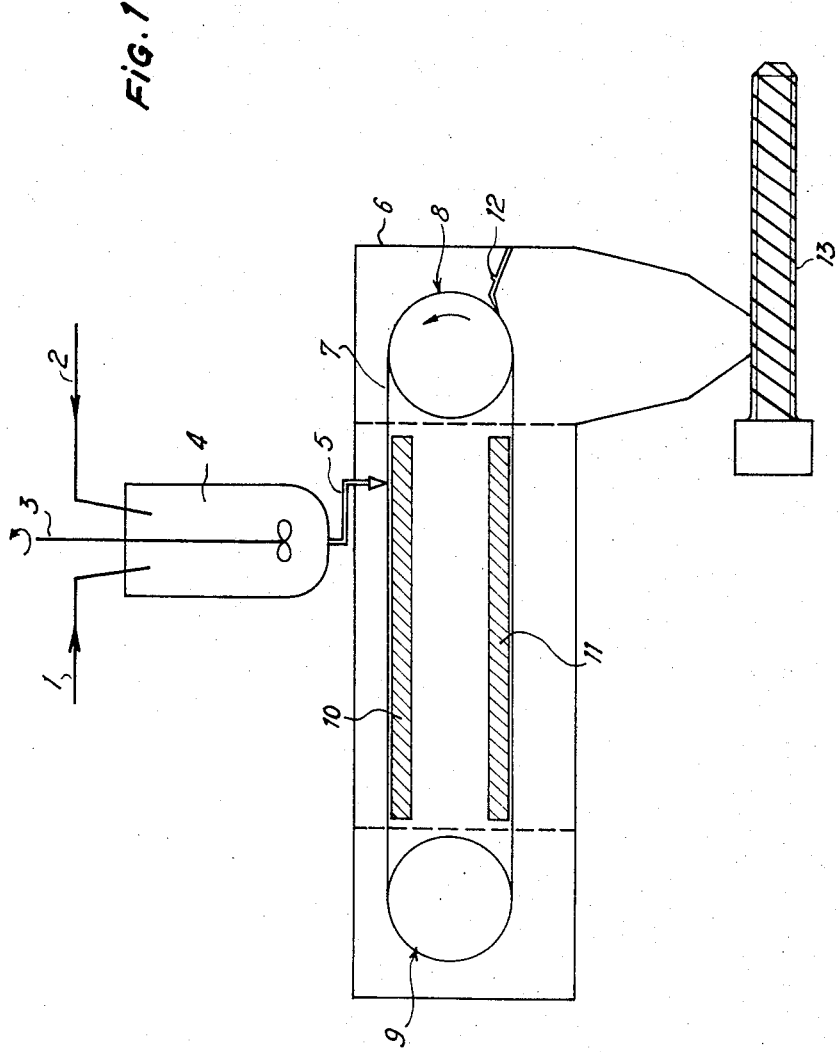

3,790,547
PROCESS FOR THE ANIONIC POLYMERIZATION OF STYRENE
Daniel Muller, Pau, France, assignor to Nationale des Petroles d'Aquitaine, Paris, France
Filed Aug. 11, 1971, Ser. No. 170,717
Claims priority, application France, Aug. 14, 1970, 7030091; July 20, 1971, 7126503
Int. Cl. C08f 1/04, 7/04, 19/00
U.S. Cl. 260—93.5 R       1 Claim

ABSTRACT OF THE DISCLOSURE

A fast polymerization process for monomers which can be polymerized by anionic catalysis, particularly styrene, possibly mixed with butadiene or in the presence of a polymer.

Figure 2:
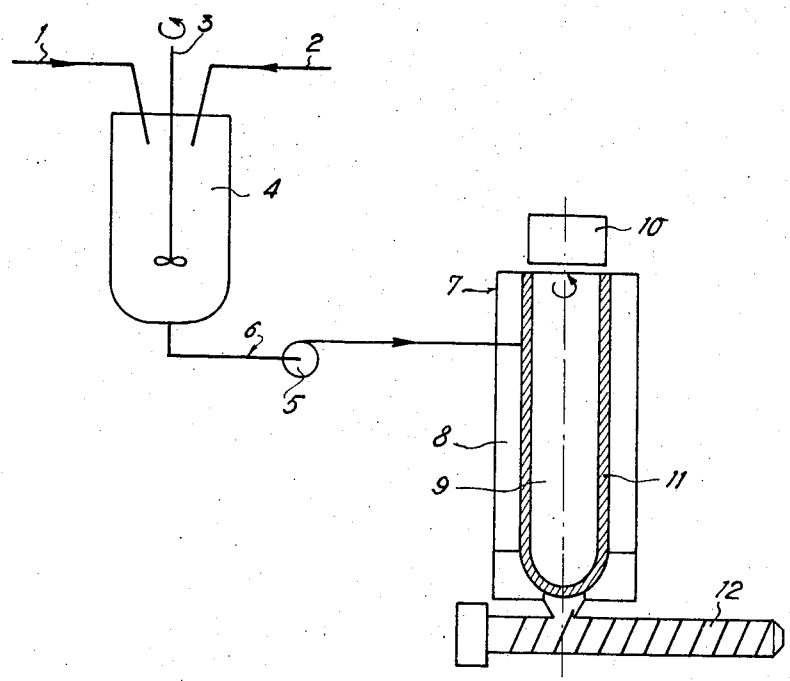

The process is characterized by the fact that the monomer or monomers are bulk-polymerized in a thin-film polymerizing plant, using an anionic polymerization catalyst, in particular an alkaline metal such as sodium, or an organo-metallic alkaline metal compound such as butyllithium.

The process results in transparent polymers free of residual monomer, showing low polydispersion and with a high molecular weight. In addition, they are not yet de-activated when leaving the polymerization plant, and can be used to obtain graft and sequence copolymers.

---

The present invention concerns a process for rapid polymerization of vinyl-aromatic monomers, particularly styrene. The polymers obtained by this process present particularly useful properties, notably regarding molecular weight, polydispersion, and the amount of residual monomer or other volatile substances present.

Industrial polymerization of styrene generally involves the use of radical-type catalysts, but the time required for such polymerization is long, several hours in fact. The speed of polymerization increases if the temperature is raised, but this results in polymers of low molecular weight, showing a high level of polydispersion, and still containing a high proportion of residual monomer, which has to be removed.

Consideration was therefore given to polymerizing styrene by anionic catalysis, which results in polymers of high molecular weight, and which shortens the time required for polymerization to a period of much less than an hour, and even in some cases less than a minute.

The common process consists of polymerizing the styrene in solvents.

The reaction can be performed at low temperatures, at around —80° C. for example, in polar solvents, or at temperatures above atmospheric temperature in non-polar solvents. This is a fast method of obtaining polymers of high molecular weight, and low polydispersion, but is uneconomic, because all the solvent has to be removed, and recovered before it can be recycled.

This made it preferable to polymerize styrene by anionic catalysis in the absence of solvent, in other words in bulk. Without solvent, polymerization occurs at high temperatures, usually above 0° C., but when the temperature is raised the reaction becomes too fast and too exothermic, and cannot be controlled. This has meant until now that polystyrene could not be produced industrially by anionic catalysis, in the absence of solvent or fillers to reduce the exothermic character of the reaction.

The process according to the present invention offers a fast method of obtaining polymers showing low polydispersion and of high molecular weight, almost free of residual monomers or other volatile products such as solvents. The process consists of bulk polymerization of styrene, using anionic polymerization catalysts, in a thin-film polymerization plant, namely an apparatus in which the reaction mixture is of slight thickness, ensuring good heat-exchange. Preferably, polymerization is performed continuously in a thin-film apparatus, of the revolving belt type, or cylindrical, conical or truncated cone-shaped, with a rotor keeping the reaction mixture in a thin layer on the inside wall of the reactor.

The process according to the invention can be used for the polymerization of vinyl aromatic monomers, alone or mixed with other monomers such as butadiene, acrylonitrile, or methyl methacrylate. These monomers can also be polymerized in the presence of other polymers, dissolved or dispersed in the said monomer or monomers. These polymers include polybutadiene and its copolymers, polyisoprene and its copolymers, polyethylene, ethylene-propylene copolymers, and ethylene-propylene-diolefin terpolymers.

In particular, the process may be used to polymerize styrene alone, or mixed with butadiene for instance, or in the presence of elastomers such as polybutadiene.

The catalysts used are all anionic polymerization catalysts, preferably alkaline and alkaline-earth metals and their organo-metallic compounds.

These alkaline or alkaline-earth metals are generally used in divided form, for example in the form of a sodium mist obtained by heating the sodium in an oven, the sodium vapour being carried along by an inert gas such as argon or nitrogen and condensed into fine particles by cooling at the oven outlet. These fumes can then be placed in suspension in the cold styrene by being bubbled through. Divided metals may also be obtained by mechanical dispersion of a molten metal or liquid alloys such as a sodium-potassium alloy in an inert solvent.

The organo-metallic compounds that are given preference are those with the formula R—M, where M represents one or more alkaline or alkaline-earth metals, and R an alkyl, aryl, aryl-alkyl or even macromolecular radical.

These compounds may be added to the cold styrene in their natural state, particularly organo-lithium compounds, which are soluble in styrene, or in the form of a solution or suspension in a solvent such as hexane or tetrahydrofuran. Many such compounds are suitable for use with this process, including naphthalene-sodium, phenyl-sodium, benzyl-sodium, diphenyl-sodium, amyl-sodium and isopropyl-sodium, triphenyl-methyl-potassium, benzyl-potassium, and tetra-α-methyl-styryl-sodium, preference being given, however, to organo-lithium compounds such as benzyl-lithium, dilithiostylbene, 1.3-bis-(1-lithio 3-methyl-pentyl) benzene, and particularly to alkyl-lithiums such as methyl-lithium, ethyl-lithium and butyl-lithium.

The concentration of catalysts can vary widely, depending on the type of catalyst, the temperature at which polymerization is started, and the molecular weight required.

The process has remarkable flexibility, since it can be used to obtain a polymer of predetermined molecular mass, without difficulty and within a very wide range of masses. The molecular weight depends basically on the concentration of catalyst, to which it is roughly in inverse proportion. A 700 p.p.m. concentration of butyl-lithium in the styrene, for instance, results in a polystyrene with a molecular weight of approximately 100,000. Temperature, on the other hand, has almost no effect on molecular weight. The concentration of catalyst is usually between 100 and 10,000 p.p.m. in relation to the styrene, and is preferably between 100 and 1,500 p.p.m.

Naturally, polymerization must be performed in an anhydrous medium and inert atmosphere, such as argon or nitrogen, and before use the styrene should therefore be dried on a molecular screen, alumina or any other dehydrating agent. Solvating agents can also be added to the reaction mixture to speed up polymerization, such as ethers, cryptates or amines, preferably tertiary amines. The styrene may also be polymerized in the presence of plasticizers, such as di-octylphthalate.

The catalysts are usually added directly to the monomer styrene, at temperatures lower than those for fast initiation of polymerization. These vary considerably depending on the type of catalyst, ranging from $-15$ to $+150°$ C. The reaction mixture is then conveyed quickly to the thin-film polymerization plant.

The temperature for the start of the reaction obviously varies depending on the type and concentration of catalyst involved. Polymerization should be started at $100°$ C. or above, for instance, when sodium is used, in order to avoid too long an inhibition period. When butyl-lithium is used, on the other hand, polymerization can easily be begun at atmospheric temperature.

Since the polymerization process is exothermic, the temperature rises rapidly once it has begun, and should be kept from exceeding $300°$ C., since beyond this temperature deteriorations could occur. Above $145°$ C., the temperature at which styrene vaporizes, it is much better to work under pressure, to prevent such vaporization. This is not essential, however, and evaporation of the styrene even allows the temperature to be controlled to some extent.

Polymerization time may vary depending on the type and concentration of catalyst, and the temperature. Preferably, it should be less than an hour, and may be as short as 15 to 20 seconds.

The process according to the present invention should be performed in a thin-film polymerization plant, namely an apparatus in which the thickness of the reaction mixture is slight, preferably less than 4 cm. and in which the surfaces in contact with the mixture allow satisfactory heat exchange.

Monomers, preferably styrene, may be polymerized in a reactor consisting of a conveyor belt revolving continuously round driving rollers. This belt is inside an apparatus in which an inert atmosphere is maintained. The belt passes through different zones, each portion of the belt coming into contact in turn with a heating zone at the upper end of the apparatus, and a cooling zone at the lower end.

Styrene polymerization is carried out as follows. The styrene and catalyst are mixed in a container outside the reactor, at temperatures such that polymerization does not occur immediately. The mixture is then injected onto the upper part of the conveyor belt, which is heated to controlled temperatures, which vary depending on the catalyst, but are generally between 50 and $300°$ C., and preferably 100 and $250°$ C. The reaction usually takes place at atmospheric pressure, and part of the styrene vaporizes and has to be recycled. Polymerization occurs very rapidly, entirely in the heating zone of the apparatus. The polystyrene which is obtained sticks to the belt, and passes into the cooling zone, where it solidifies and is removed from the belt by scrapers, so that it drops directly into an extruder.

It is preferable, however, to perform polymerization by making use of thin layers of the reaction mixture passing between two surfaces which are good heat conductors, so that the heat produced during polymerization can be eliminated satisfactorily by heat exchange.

The invention provides for use of a cylindrical, conical or truncated cone-shaped polymerization apparatus, preferably with a double casing, against the inner surface of which the reaction mixture is held in the form of a thin film by a rotor. This rotor may consist of a cylinder, cone or truncated cone, with a spiral thread, or simply an axle with blades which press the reaction mixture against the inside surface of the reactor. The space between rotor and stator depends on the dimensions of the reactor and speed of the motor, but it is usually less than 4 cm.

In order to improve heat exchange, increase the capacity of the apparatus and reduce the viscosity of the reaction mixture considerably, the rotor should be made to revolve at high speed, and the space between stator and rotor should be kept as narrow as possible. According to the invention, velocity gradients of more than $10^2$ seconds$^{-1}$, and preferably between $10^3$ and $10^6$ seconds$^{-1}$, should be created in the apparatus. The velocity gradient is defined as the ratio $V/e$, where V is the linear velocity at the ends of the rotor, and $e$ the thickness of the film of reaction mixture, in other words the space between rotor and stator. In the case of a conical or truncated cone-shaped apparatus, V is measured half-way between the upper and lower ends of the cone or truncated cone.

The mixture of monomers and developing polymers, and the molten polymer, present non-Newtonian hydrodynamic properties: in other words, at high shearing levels (high velocity gradient) their viscosity drops considerably, resulting in substantial savings in the energy needed to drive the rotor.

The upper limit of the velocity gradient between rotor and stator is governed only by the mechanical capacity of the apparatus, and the possibility of deterioration of the developing polymers occurring.

The apparatus may be heat-controlled by a heat-regulating fluid circulating inside the stator and/or rotor. In general, the apparatus is kept under enough pressure to prevent vaporization of the monomer or monomers. Although it is less economic to do so, it is also possible to operate at lower pressure, in which case vaporization of the monomer or monomers allows the polymerization temperature to be controlled even better.

Styrene is polymerized in such an apparatus as follows. The styrene and catalyst are mixed in a container outside the reactor, at temperatures such that polymerization does not occur immediately. A feed-pump is then used to force the mixture into the upper end of the reactor, which is kept under pressure. The styrene and catalyst may also be fed directly into the reactor supply chamber, without preliminary mixing. The temperature is kept at between 100 to $250°$ C. by the cooling fluid, and the molten polymer reaches the lower end of the apparatus, where it can be transferred into an extruder and granulated.

Polymers obtained by the process according to the invention are not yet de-activated when they leave the reactor, in other words still subject to reactions. They can be de-activated in air, water, or by means of inorganic or organic alcohols or acids, or by fixing reactive functions on the ends of the macromolecular chains, through the effect of compounds such as carbon dioxide, ethylene oxide, chlorides of various acids, esters, aldehydes, cetones, imines, isocyanates, nitriles, and halides.

The non-de-activated polymer may also be made to react by being mixed in the extruder at the reactor outlet with monomers or other compounds as modifying agents, fillers, or polymers bearing suitable functions, thus producing chemically modified polymers, polymers grafted on to certain fillers, and sequence graft copolymers.

These modifying agents include certain reagent plasticizers, fire-proofing or stabilizing agents, or polyfunctional coupling agents, all bearing one or more functions that will react with the carbanions at the ends of the non-de-activated polymer macromolecules, such as those mentioned above. These modifying agents also include compounds encouraging metallation reactions in the polymer chain, such as the polydentate chelates formed by tertiary amines such as tetramethyl ethylene diamine, and cryptates, with organo-metallic and particularly organo-lithium compounds.

Fillers that can be fixed at least partly to the non-de-activated polymer are those with functions, on their surface, that will react with carbanions, in particular carbon black, oiled glass fibre, or polyester or acrylonitrile fibre.

Monomers that will react with the end carbanions of the non-de-activated polymer, producing sequence copolymers, are in general all vinyl compounds with an electron affinity near or higher than that of styrene, monomers bearing oxiran or thi-iran functions, such as ethylene or propylene oxides and sulphides.

The sequence copolymers obtained are bi- or multi-sequence copolymers, depending on whether the initiator used is mono- or multi-functional.

Polymers that will react with the end carbanions of the non-de-activated polymer, producing graft copolymers, are those with reagent functions such as those mentioned above, namely halogen, ester, cetone, aldehyde, imine, isocyanate, oxiran, thi-iran, etc.

These copolymers include chlorinated polyethylenes and polypropylenes, vinyl and vinylidene polychlorides, polychloroprenes, chlorinated butyl rubbers, polymers and copolymers of various acylates and methacrylates, acrylonitrile and vinyl pyridine, and epoxidized polymers.

These polymers can result in partly reticulated copolymers, if the non-de-activated polymer has been initiated during the first phase by a polyfunctional anionic initiator.

It should also be noted that all these grafting and sequencing reactions involving carbanionic de-activation can be improved considerably by the presence of traces of specific solvating agents, such as ethers, tertiary amines, cryptates and other compounds with basic Lewis properties.

The process according to the invention thus not only produces transparent polymers free of residual monomer or other volatile products, showing low polydispersion, and with the molecular weight desired, but also offers the possibility of sequence or graft polymers, or with reagent functions, using a quick, simple method.

The invention is illustrated by, without in any way being confined to, the following examples.

EXAMPLLES 1 TO 4

Figure 1:
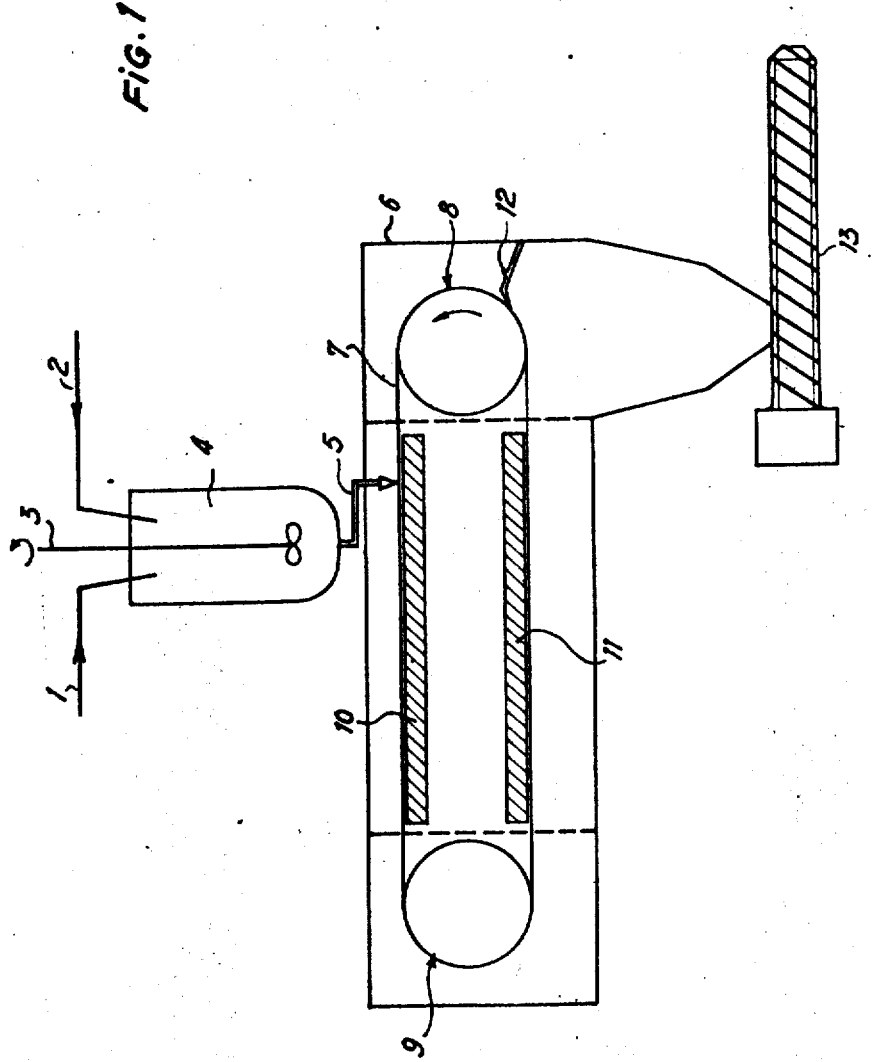
Figure 2:
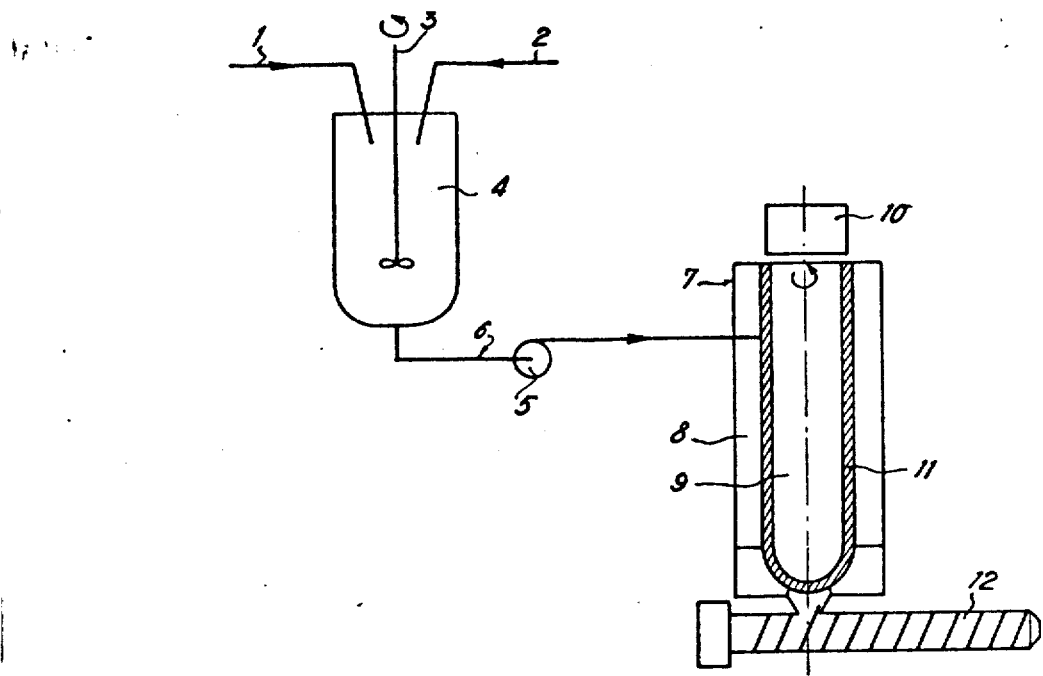

FIG. 1 shows, in diagrammatic form, a thin-film apparatus of the conveyor-belt type.

The reactor 4, in which the monomer and catalyst are mixed, is equipped with a stirrer 3 and inlets 1 and 2 for the catalyst and monomer.

The mixture is then conveyed to the feed-chamber 5 and into the container 6, where it reaches the belt 7, which revolves round two driving rollers 8 and 9. This belt usually consists of a strip of steel, 20 to 30 mm. thick. At the upper end of the apparatus, this belt moves through a heating zone 10, the temperature of which can be regu-regulated at between 50, and 300° C., generally being set at between 100 and 200° C., depending on the type of monomer and catalyst and the working pressure of the apparatus. The belt then passes into a cooling zone 11, kept at a temperature below or equal to atmospheric temperature, by circulation of fluid.

The belt revolves at a speed such that each point on it remains in the heating and cooling zones 10 and 11 for between 15 seconds and 2 minutes, and preferably 15 to 40 seconds. Scrapers 12 detach the polymer, which is collected in the extruder 13.

Polymerization is carried out as follows.

The styrene, preferably dehydrated, and 750, 900, 1000 and 4000 p.p.m. of butyl-lithium respectively, depending on the test involved, are mixed in the container 4.

The mixture remains not more than a few seconds in the reactor 4, and is then quickly transferred to the polymerization plant, where it is polymerized at between 100 and 250° C. in 15 to 30 seconds, depending on the test.

The reaction is markedly exothermic in character, and at the end of the heating zone there is an orange-colored, molten polymer. This is cooled inthe cooling zone 11, at temperatures of less than 10° C., in order to make it very brittle. It is then detached from the belt by scrapers, and collected in the extruder.

The fraction of monomer that has vaporized (up to 15%, if polymerization is performed at ordinary pressure) is recovered at the upper end of the cooling zone, and recycled directly, without further treatment.

The polymers obtained become transparent and colorless when de-activated by exposure to air, water, carbon dioxide or any other agent for completing ionic polymerization. They contain no residual monomer.

The results of the tests performed are shown in Table 1.

EXAMPLE 5

FIG. 2 shows, in diagrammatic form, a thin-film apparatus with a high velocity gradient.

The reactor 4, with a capacity of 50 cl., in which the monomer and catalyst are mixed, is equipped with a stirrer 3, and inlets 1 and 2 for the catalyst and monomer.

The reaction mixture is conveyed by the feed-pump 5 and feed-pipe 6 into the thin-film polymerization plant 7, consisting of a stator 8 and rotor 9, driven at high speed by a motor 10. The apparatus is 8 cm. in diameter, and has a thin-film length of 50 cm. The distance between stator and rotor is 1 to 2 mm., and the rotor velocity ranges from 200 to 1,000 r.p.m., involving velocity gradients of approximately $4 \times 10^2$ to $4 \times 10^3$ seconds$^{-1}$. The stator is heat-controlled by fluid circulation.

The reaction mixture is polymerized in the space 11 between rotor and stator, and then collected in the extruder 12.

Polymerization is performed as follows.

The styrene is mixed with 1 p.p.m. of butyl-lithium in the container 4, and the mixture is quickly transferred to the polymerization plant, after not more than a few seconds in the container 4. The apparatus is kept under pressure high enough to prevent vaporization of the monomer.

When the regulating fluid temperature is around 150 to 200° C., the internal pressure is approximately 2 to 5 bars, but it can reach 20 to 30 bars for much higher temperatures. After remaining for 5 to 30 seconds in the thin-film part of the apparatus, at a temperature of 150 to 200° C., the polymer is extruded. The temperature of the developing polymer does not exceed 250° C. The capacity of the plant can reach 60 kg. per hour. The polymers obtained have a molecular weight of approximately 70,000, and usually show polydispersion of less than 3. The residual monomer content cannot be measured, and the polymer is colorless and transparent.

EXAMPLE 6

Non-de-activated, molten polymer, prepared as in Example 5, is transferred to an extruder containing a mixing area. As well as the active polystyrene, this extruder is fed with polymethyl methacrylate melted in a second extruder.

Analysis of the copolymer obtained by mixing shows that, alongside the two homopolymers, there is a large proportion of polystyrene/polymethyl methacrylate graft copolymer.

Depending on the amounts of homopolymers and method of mixing, the graft copolymer can contain up to 80% of the polymethyl methacrylate used.

The presence of this graft copolymer greatly improves the compatibility of the mixture, and the mechanical properties and surface appearance of the extruded product.

TABLE 1

| Ex. | Butyl-lithium (p.p.m.) | T., °C. | t., sec. | $M_w$ | $M_n$ | Tensile strength (kg./sq. cm.) | Elongation (percent) | Bending strength (kg./sq. mm.) | Dynstat impact (kg./cm./cc.) | T g.° |
|---|---|---|---|---|---|---|---|---|---|---|
| 1 | 750 | 100-245 | 30 | 406,000 | 99,000 | 611 | 7 | 11.3 | 8.2 | 95 |
| 2 | 900 | 130-250 | 30 | 195,000 | 68,000 | 570 | 6 | 9.4 | 8.6 | 95 |
| 3 | 1,000 | 100-250 | 20 | 181,000 | 59,000 | 606 | 6 | 10.3 | 7.5 | 96 |
| 4 | 4,000 | 100-250 | 15 | 36,500 | 16,000 | | | | | |

NOTE.—T., °C.=Temperature extremes in the heating zone; t.=Polymerization time in the heating zone; T g°=Vitreous transition temperature of the polymer obtained; $M_w$=Molecular mass in weight; $M_n$=Molecular mass in number.

What is claimed is:

1. An anionic polymerization process for styrene which comprises polymerizing said styrene in bulk in a cylindrical, conical or truncated cone-shaped polymerization reactor provided with a rotor revolving inside the reactor wherein the mixture is fed between the surface of the wall of the reactor and the surface of the rotor in the form of a thin film while rotating said rotor at a velocity gradient $V/e$ at between $10^3$ and $10^6$ seconds$^{-1}$ in which V is the velocity of the rotor and $e$ is the thickness of said thin film.

References Cited

UNITED STATES PATENTS

| 3,141,868 | 7/1964 | Fivel | 260—85.5 |
| 3,536,680 | 10/1970 | Illing | 260—93.5 S |
| 3,040,013 | 6/1962 | Kuhn | 260—93.5 S |
| 3,554,997 | 1/1971 | Bates et al. | 260—83.7 |
| 3,595,846 | 7/1971 | Rouzier | 260—93.55 |

OTHER REFERENCES

Encyclopedia of Polymer Science and Technology, vol. 13, pp. 184-7 and 196-9, Interscience, New York (1970), TP 156.P6E6.

JOSEPH L. SCHOFER, Primary Examiner

A. HOLLER, Assistant Examiner

U.S. Cl. X.R.

260—83.7, 877, 878 R, 879, 880 R, 881, 882, 884, 885, 886

UNITED STATES PATENT OFFICE
CERTIFICATE OF CORRECTION

Patent No. 3,790,547    Dated February 5, 1974

Inventor(s) Daniel Muller

It is certified that error appears in the above-identified patent and that said Letters Patent are hereby corrected as shown below:

In the grant (ONLY) insert sheets 1 and 2, as part of Letters Patent. In the heading to the printed specification, lines 4 and 5, "Nationale des Petroles d'Aquitaine" should read -- Societe Nationale des Petroles d'Aquitaine --.

Signed and sealed this 26th day of November 1974.

(SEAL)
Attest:

McCOY M. GIBSON JR.
Attesting Officer

C. MARSHALL DANN
Commissioner of Patents